July 26, 1960

R. W. GILBERT 2,946,930

MAGNETIC SUSPENSION

Filed June 20, 1955

2 Sheets-Sheet 1

ROSWELL W. GILBERT
INVENTOR.

BY
Rudolph J. Junick
ATTORNEY

July 26, 1960 R. W. GILBERT 2,946,930

MAGNETIC SUSPENSION

Filed June 20, 1955 2 Sheets-Sheet 2

ROSWELL W. GILBERT
INVENTOR.

BY Rudolph J. Zurick
ATTORNEY 2,946,930

MAGNETIC SUSPENSION

Roswell W. Gilbert, Montclair, N.J., assignor, by mesne assignments, to Daystrom, Incorporated, Murray Hill, N.J., a corporation of New Jersey Filed June 20, 1955, Ser. No. 516,517

4 Claims. (Cl. 317—123)

This invention relates to a method of and apparatus for the suspension of a magnetized or magnetizable object in free space by unidirectional and generally steady-state linkage of magnetic flux.

Magnetic fields have been used in many devices for suspension in the form of thrust bearings and the like, but contact restraint has been found necessary in at least one direction. Of course, alternating magnetic fields have been used for full suspensions, but they are not static in the sense here intended.

The full magnetic support of an object in free space by static magnetic force, that is, by a purely steady-state linkage of magnetic flux, has been considered by many as posing a fallacy. Any attempt to suspend an object entirely by a stationary magnetic field results in at least one unstable direction.

I have found that feedback techniques may be applied to compensate for the metastable condition effectively to produce a stable suspension. Feedback is capable of providing impedance parameters of negative sign as a practical operation, to produce apparent inversions in systems connected thereto. In this case, the physical result is admittedly peculiar, but the qualitative theory here presented agrees with experiment and is peculiar only in the concept of negative impedance which is a perfectly valid extension of electrical theory.

For example, a mass may be suspended in a fashion leaving one unstable direction, such as a simple attraction of a ferro-magnetic mass or article by an overhead permanent magnet or electromagnet. The system may then be coupled to an outside source and, by feedback techniques, the sign of the supporting force gradient may be reversed. The system thereby becomes stable in the previously unstable direction, but it is still truly static in the sense that energy is exchanged only in incremental amounts in response to disturbing forces.

An object of my invention is the provision of a method of suspending a magnet, or other ferro-magnetic mass or object, in free space, using only a primary, spaced magnetic support directly thereabove and surrounding solenoid means to which is connected an electrical feedback system to apply only incremental electromagnetic force thereto to act if, as and when the object departs from its equilibrium position, in order to effectively stabilize its suspension.

An object of my invention is the provision of apparatus for suspending a magnet, or other ferro-magnetic mass or object, in free space, said apparatus comprising an overhead primary magnetic supporting means, a coil surrounding the object, and a feedback system connected to said coil means and adapted to apply incremental electromagnetic force to the suspended object only as it departs from its equilibrium position.

These and other objects and advantages of the invention will become apparent from the following specification, when taken with the accompanying drawings. It will be understood, however, that the drawings are for purposes of description and are not to be construed as defining the scope or limits of the invention, reference being had for the latter purpose to the claims appended hereto.

In the drawings, wherein like reference characters denote like parts in the several views.

Figure 1:
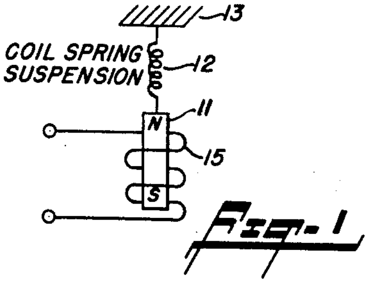
Figure 1 is a diagram representing a coil spring suspension of a magnetizable mass or magnet which is surrounded by a solenoid coil.
Figure 2:
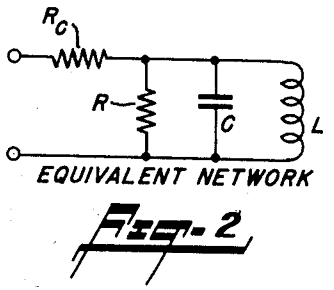
Figure 2 is a diagram illustrating the equivalent electrical network of the Figure 1 system.
Figure 3:
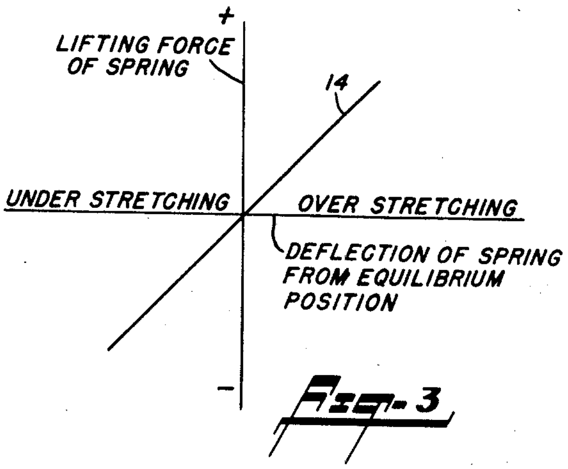
Figure 3 is a graph showing the relationship between overstretching or understretching of the spring and the excess or deficiency in the spring lifting force thereby developed.

Referring now to the drawings, there is shown in Figure 1 a simple structure comprising a magnetizable mass or magnet 11 suspended by a coil spring 12 from a fixed support 13. The suspension is obviously stable because the force/deflection gradient of the spring is positive, as represented by the graph 14 in Figure 3. A coil 15 is coupled to the magnet so that current in the coil will exert a force upon the magnet and, conversely, motion of the magnet will induce a potential within the coil. Looking into the coil terminals, the system appears as the equivalent electrical network illustrated in Figure 2. In this figure, the mass of the magnet 11 appears as a capacitance C, the spring compliance as an inductance L, and frictional losses as a shunting resistance R, effectively damping the system. The coil resistance $R_c$ appears as itself.

The Figure 1 system may be considered as stable because the exponential time-constant of damping, $L/R$, is positive. When the system is displaced, as by pulling down or pushing up on the magnet 11, the produced disturbance decays to a point of stable equilibrium.

Figure 4:
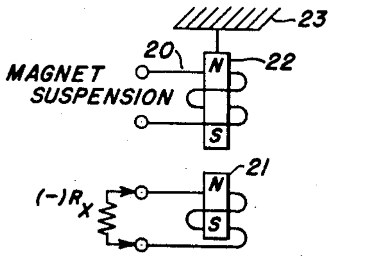
Figure 4 is a diagram which represents a suspension, generally like that of Figure 1 but modified by replacing the coil spring by a permanent or electromagnet alined to develop a supporting force on the suspended mass, said suspended mass being surrounded by a solenoid coil connected to a negative impedance device.

Figure 4 shows a generally similar system modified by replacing the coil spring 12 by a magnet 22 (indicated as a possible electromagnet by showing a surrounding coil 20) suspended from a fixed support 23, and in line to develop a supporting force on the suspended magnetizable mass or magnet 21. This arrangement is recognizably unstable, because the sign of the supporting compliance is now negative, and the force/deflection-or-movement gradient is the reverse of that in the Figure 1 system, as indicated by the graph 24 of Figure 6. The inductance, in the equivalent network represented in Figure 5, now appears negative in sign, and the time-constant of damping, $-L/R$, is likewise negative. In this Figure 5, the reference characters correspond with those of Figure 2. The system is unstable and the suspended object 21 will drift away from its metastable equilibrium point.

Figures 5, 6:
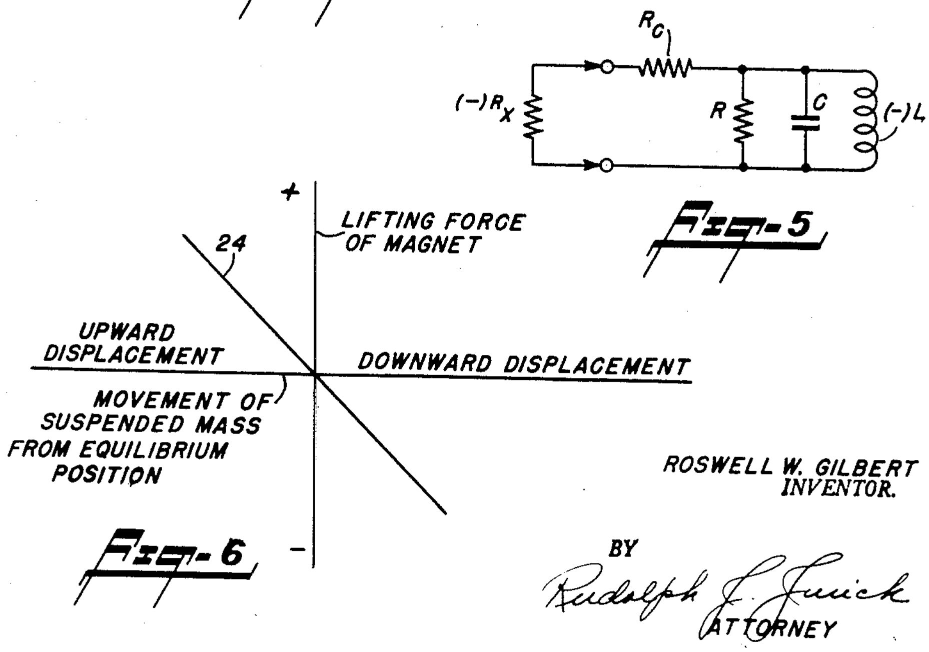
Figure 5 is a diagram showing an electrical network equivalent to the arrangement of Figure 4.
Figure 6 is a graph showing the relationship between movement of the suspended mass and the deficiency or excess in the lifting force thereby available from the suspending magnet.

In order to stabilize the system, we connect to the terminals, as indicated in Figure 5, a negative resistance source, $-R_x$, in an amount sufficient to at least compensate for $R_c$, so that;

$$(-)R_x+R_c<0 \quad (1)$$

The damping resistance R will now be shunted by a resistance less than zero, and the time-constant will be:

$$\frac{(-)L[R+R_c+(-)R_x]}{R[R_c+(-)R_x]}>0 \quad (2)$$

or positive in sign. The system will now be stable.

The overall resistance by itself is unstable, and the negative inductance by itself is unstable. But the two are mutually stable. Negative resistance applied to the Figure 1 system would make it unstable in the same sense that positive resistance applied to the Figure 4 system cannot make it stable.

Expressing the matter differently, it is pointed out that positive resistance is always a receiver of energy, whereas negative resistance is always a source of energy. The equilibrium condition of the Figure 1 system is the state of minimum contained energy, and it delivers energy in returning to a state of equilibrium. The reverse is true in the Figure 4 system, the equilibrium condition is the point of maximum contained energy and a return to such condition requires a receipt of energy, as from a negative resistance.

Figure 7:
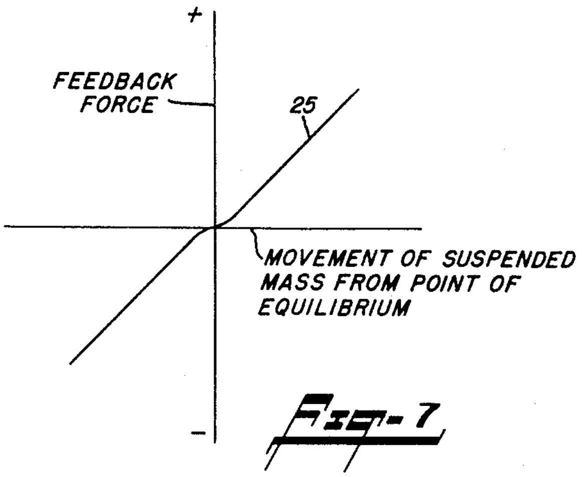
Figure 7 is a graph showing what is provided by the magnetic impedance feedback to the solenoid coil to stabilize the support by the suspending magnet.

This situation is shown graphically in Figures 6 and 7, where the graph 24 of Figure 6 shows that as the mass 21 moves down (represented as to the right in the figure), from the magnet 22, the suspending force decreases. That is, the differential of that force over the weight of the suspended magnet 21 becomes negative. Upon raising the mass 21 the differential becomes positive, as shown by the left hand portion of the graph 24, or that to the left of the neutral or zero position.

This absence of stable equilibrium is necessarily avoided by something which gives an effect generally equivalent to that represented by the graph 25 in Figure 7, where the suspending force increases as the position of the suspended mass is lowered, and decreases as the position of the suspended mass is raised. This necessary stabilizing force is what is supplied by the feedback arrangement, to thereby at least neutralize the unstable influence of the lifting magnet 22, represented by the graph 24.

Figure 8:
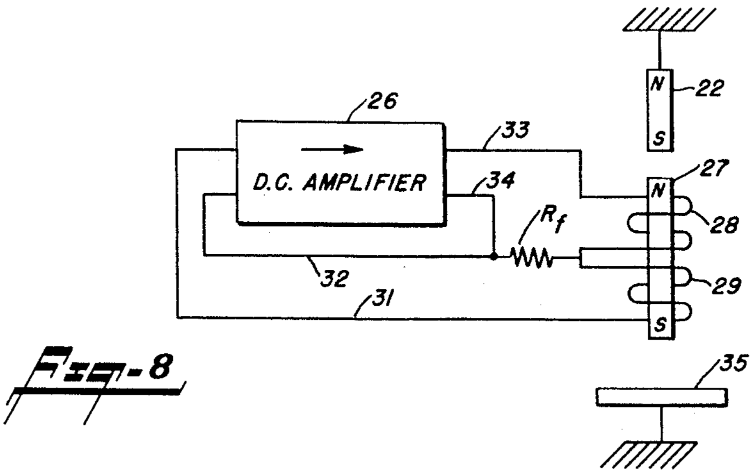
Figure 8 is a wiring diagram of a practical embodiment for feedback suspension, in accordance with my invention.

Figure 8 shows a wiring diagram representing a practical embodiment wherein the effective negative resistance is obtained by feedback through a direct current amplifier 26. The solenoid around the suspended mass or magnet 27 is here divided into two coils, 28 and 29, in a mutual configuration to entirely avoid the self-resistances of the coils. This reduces the coil resistance of the equivalent network to zero so that the applied negative resistance is fully effective. The pick-up coil 29 is connected to the input side of the amplifier by leads 31 and 32, one of said leads including the coupling resistor $R_f$. The output side of the amplifier is connected to the exciting coil 28 through leads 33 and 34, one of said leads including the same coupling resistor $R_f$. The feedback amplifier is thus connected from the pick-up coil 29 to the excitation coil 28, with the mutual inductance in positive, or degenerative, sense. Negative resistance is developed by a resistor $R_f$, mutual to both coil circuits, in regenerative sense and, therefore, a regenerative resistor.

It will be apparent that the feedback through the coupling resistor $R_f$ is positive and thus normally unstable. It is here stable only because of the coupled negative inductance presented by the suspension. If the suspended mass 27 were clamped, the system would fall away from its unstable equilibrium point, but when free the system will relapse to a stable equilibrium point in the fashion of the intrinsically stable Figure 1 system. This necessary negative resistance, $(-)R_x$ is thus developed by a resistor mutual to both coil circuits in a regenerative sense. If desired, a high conductivity damping plate 35 may be disposed beneath the suspended magnet 27, and thereby included in the system as shown, to damp any motion which may be developed.

The concept of negative inductance is unusual but apparently valid although it perhaps has no counterpart in any actual electrical component except in a feedback system. Importantly, the negative inductance contains its maximum energy at zero current, and perhaps is better visualized in terms of entropy, but it appears as a direct extension of well established theory of electromechanical coupled systems by simply reversing the sign of the compliance.

In operation, the system will seek its equilibrium position, at which point the excitation current to the amplifier will reduce to zero. If the suspended magnet moves below its equilibrium position, the current developed in the surrounding coils 29 will exert a lifting force thereon to prevent its dropping from a supported position. If perchance, it should rise above its equilibrium position, a reverse current will develop to pull it back to its equilibrium position.

From the foregoing, it will be seen that I have provided a method and apparatus for suspending magnetizable material in free space. As an example of the usefulness of such an invention, it is pointed out that in certain nucleonic instruments, such as ion chambers, insulation leakage sets a limit to sensitivity despite the excellence of such insulating materials as Teflon and polyethylene. For example, a charged body may be suspended in an ionizable atmosphere and the loss of charge by ionic conduction through the gas used as a measure of ionization. At low radiation levels, such a structure may have a loss time-constant of weeks, or even of years, if the supporting insulation can be made perfect. The magnet suspension herein described may be used to support the charged body without insulation and direct leakage is then known to be absolutely zero. The loss rate is then entirely due to ionic conduction through the surrounding atmosphere and the major uncertainty of the quality of the insulation is completely removed. The initial and subsequent state of charge on the body may readily be measured in practice by capacitive coupling to the body, in the fashion of a vibrating reed electrometer, without physical contact therewith.

Having now described my invention in detail in accordance with the requirements of the patent statutes, various changes and modifications will suggest themselves to those skilled in this art, and it is intended that such changes and modifications shall fall within the scope and spirit of the invention, as recited in the following claims.

I claim:

1. Apparatus for suspending a body of magnetizable material in free space solely by magnetic forces, comprising primary static magnetic supporting means proximate to the body, coil means surrounding the body, and a feedback system connected to said coil means to apply incremental stabilizing electromagnetic forces to the body in response to changes in the flux linkage between the body and the static magnetic supporting means.

2. Apparatus for suspending in free space entirely by magnetic forces a mass including magnetizable material, comprising primary static magnetic supporting means disposed above said material, solenoid coil means surrounding said material, and a feedback system connected to said coil means to apply incremental stabilizing electromagnetic forces to said suspended material, to assist the primary magnetic forces when the suspended material tends to fall, and to oppose said primary forces when said material tends to rise.

3. The invention as recited in claim 2, wherein the feedback system comprises an amplifier, a resistor connected to an intermediate point of the solenoid coil means, dividing said means into an exciting coil and a pick-up coil, in which said pick-up coil is connected to the input side of the amplifier and the exciting coil is connected to the output side of said amplifier, with the resistor common to both circuits, whereby the entire feedback system, acts as a negative resistance.

4. The method of stalilizing the metastable equilibrium of a body of magnetizable material suspended in free space solely by static magetic forces, which method comprises applying secondary incremental magnetic equalizing forces to the body in response to changes in the flux linkage between the body and the static magnetic forces.

References Cited in the file of this patent

UNITED STATES PATENTS

| | | |
|---|---|---|
| 1,707,822 | Stock | Apr. 2, 1929 |
| 2,081,367 | Nicolson | May 25, 1937 |
| 2,256,937 | Beams | Sept. 23, 1941 |
| 2,602,660 | Shannon | July 8, 1952 |
| 2,647,323 | Johnson et al. | Aug. 4, 1953 |
| 2,675,222 | Clark | Apr. 13, 1954 |
| 2,852,243 | Shepard | Sept. 16, 1958 |